Figure 1:
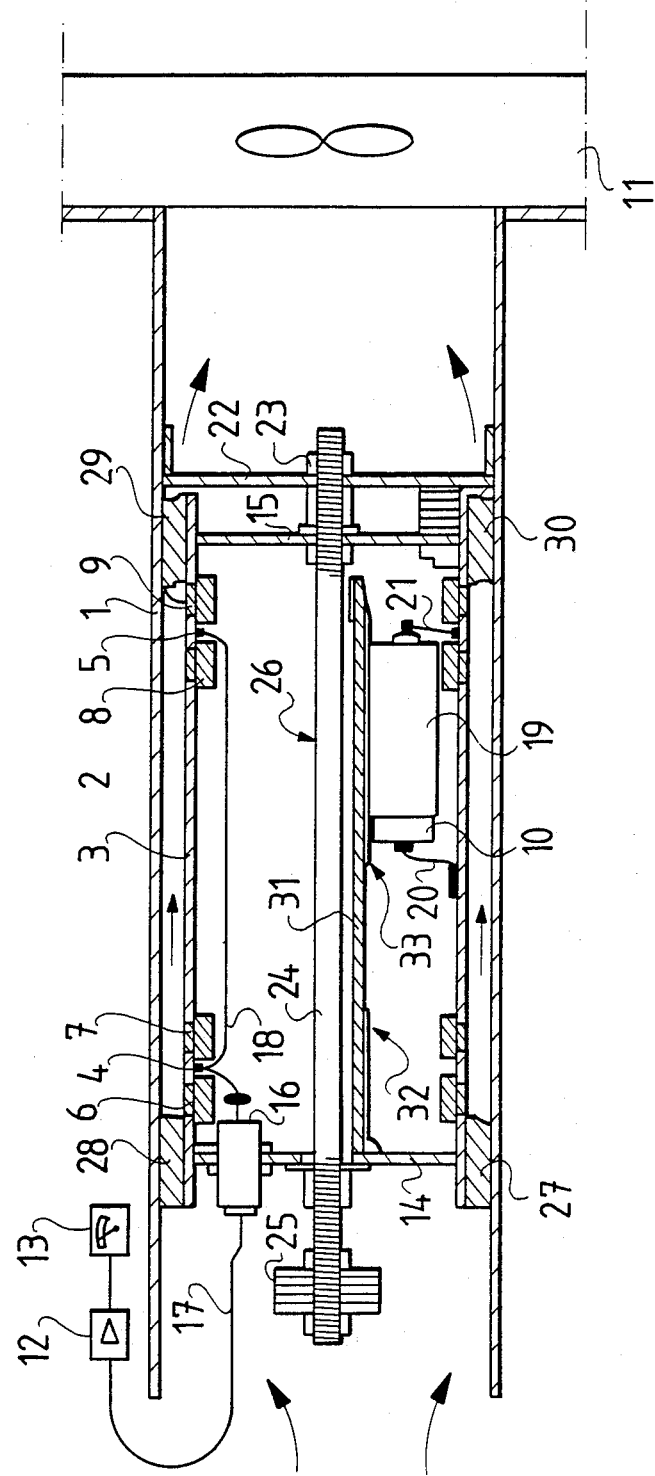

United States Patent [19]

Ilmasti

[11] Patent Number: 4,868,386
[45] Date of Patent: Sep. 19, 1989

[54] METHOD AND APPARATUS FOR MEASURING RADON CONTENT IN THE AIR

[75] Inventor: Veikko Ilmasti, Helsinki, Finland

[73] Assignee: Ilmasti Elektroniikka Oy, Ventaa, Finland

[21] Appl. No.: 66,545

[22] Filed: Jun. 26, 1987

[30] Foreign Application Priority Data

Oct. 7, 1986 [FI] Finland .................................. 864055

[51] Int. Cl.⁴ ............................................. G01T 1/185
[52] U.S. Cl. ....................................... 250/253; 250/255
[58] Field of Search ........................ 250/253, 255, 380

[56] References Cited

U.S. PATENT DOCUMENTS

| | | | |
|---|---|---|---|
| 4,055,762 | 10/1977 | Durkin | 250/253 |
| 4,104,523 | 8/1978 | Wolfert | 250/255 |
| 4,262,203 | 4/1981 | Overhoff | 250/380 |

FOREIGN PATENT DOCUMENTS

| | | | |
|---|---|---|---|
| 0056767 | 4/1982 | Japan | 250/380 |
| 1080378 | 8/1967 | United Kingdom . | |

Primary Examiner—Janice A. Howell
Assistant Examiner—Richard Hanig
Attorney, Agent, or Firm—Barnes & Thornburg

[57] ABSTRACT

A method and apparatus for measuring radon content in the air, in which procedure the radon content in the air is measured by measuring the ion content of the air caused by the radon in the air and by its decay products.

7 Claims, 3 Drawing Sheets

METHOD AND APPARATUS FOR MEASURING RADON CONTENT IN THE AIR

The present invention concerns a procedure and an apparatus for measuring radon content in the air.

Currently, no portable measuring instruments exist for measuring radon content in the air. For detecting the radon gas content in the air, the alfa film procedure is being applied, in which an alfa film is kept, for instance in a room, for prolonged periods of time, even several months. Hereby a long-time mean of the radon content is obtained. The greatest drawback of this procedure is its slowness.

For indicating radon content, also scintillation and semiconductor detectors may be used, but their drawback is high price and cumbersome implementation of the measurement in practice.

The object of the present invention is to eliminate said drawbacks. The procedure of the invention for measuring radon content in the air is mainly characterized in that the radon content of the air is measured by measuring the ion content of the air caused by the radon in the air and by its decay products. Since the ion content of the air is in a clear relationship to the radon content of the air, the radon content can be measured by measuring the ion content of the air. In measuring the ion content, a rapid response is always obtainable. With the procedure of the invention, a continuous reading of the radon content in the air is obtained.

An advantageous embodiment of the procedure of the invention is characterized in that the ion content of the air is measured by directing the negative or positive ions in the air to at least one electrode and by measuring the current or voltage of at least one electrode.

An advantageous embodiment of the procedure of the invention is also characterized in that air is conducted into a tube, the ions going to electrodes located therein.

The means applying the procedure of the invention, comprising a unit for reading the results of measurement, is characterized in that the means has an outer tube through which the air passes, an inner tube holding at least one electrode, at least one additional electrode, as well as insulating rings which separate the electrodes from each other and from the ends of the inner tube, a voltage supply, a fan for guiding air through the outer tube, and an amplifier for amplifying the measuring signal obtained from at least one electrode, and that the means is portable. It is possible with the means of the invention to accomplish extensive radon studies in buildings within a short period of time. In addition, it is possible to clarify, with the means of the invention, the radon contents at leakage points by transporting the means through various rooms, the means being portable. Prior to refurbishments in said buildings serving to reduce the radon values, or after them, it is also possible to establish rapidly the initial values and the values subsequent to the refurbishing. An advantage of the means is also that a continuous reading of the radon content is obtained.

An advantageous embodiment of the means implementing the procedure of the invention is characterized in that the inner tube is detachable. This facilitates the cleaning of the means.

An advantageous embodiment of the means applying the procedure of the invention is also characterized in that the means is provided with guiding spindles or equivalent with which the inner tube can be centred in the the outer tube.

An advantageous embodiment of the means applying the procedure of the invention is also characterized in that the voltage supply is a battery which can be accommodated in the inner tube. This is the best place for the voltage source since the sensitivity is improved when there are no losses due to the insulation of the leads at their insertion points; furthermore, interferences are reduced when the voltage source is located in a well-protected position. Furthermore, replacing the battery is easy, owing to the detachable inner tube. The battery is a small and inexpensive power supply. Moreover, the battery has good voltage stability.

A further advantageous embodiment of the means applying the procedure of the invention is characterized in that the amplifier comprises a timer with which the measurement can be started and stopped. This helps to reduce the measuring error since the measurement can be started over again when a given time has passed since the preceding measurement.

An advantageous embodiment of the means applying the procedure of the invention is also characterized in that the amplifier comprises a humidity alarm by which the measurement can be interrupted whenever the humidity surpases a pre-set limit.

An advantageous embodiment of the means applying the procedure of the invention is also characterized in that the inner tube contains two electrodes with the same polarity and which can be connected to each other with a conductor.

The invention is described in the following in detail with the aid of an example and referring to the drawing attached, in which FIG. 1 presents the meter of the invention used for measuring radon content in the air.

Figure 2:
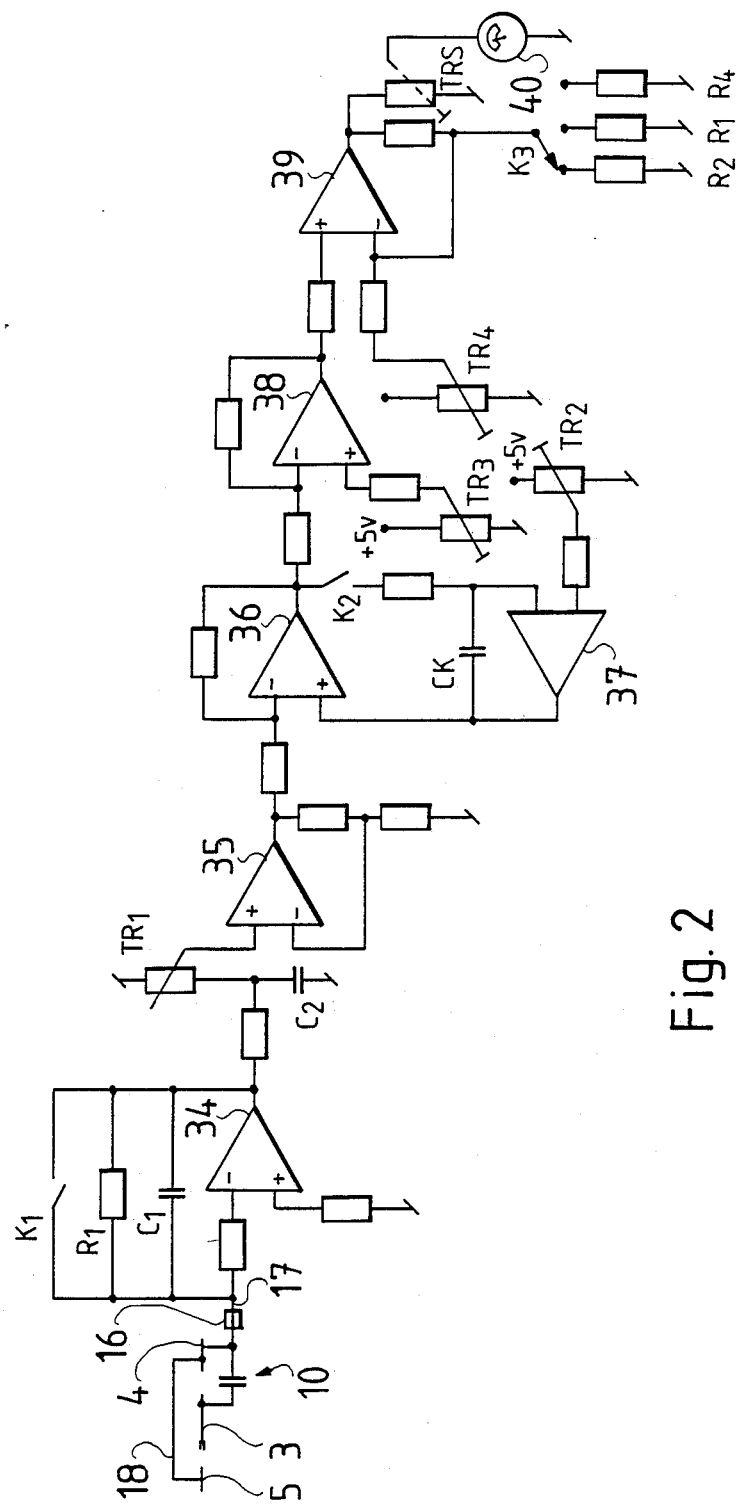

FIG. 2 presents the measuring amplifier of the meter shown in FIG. 1.

Figure 3:
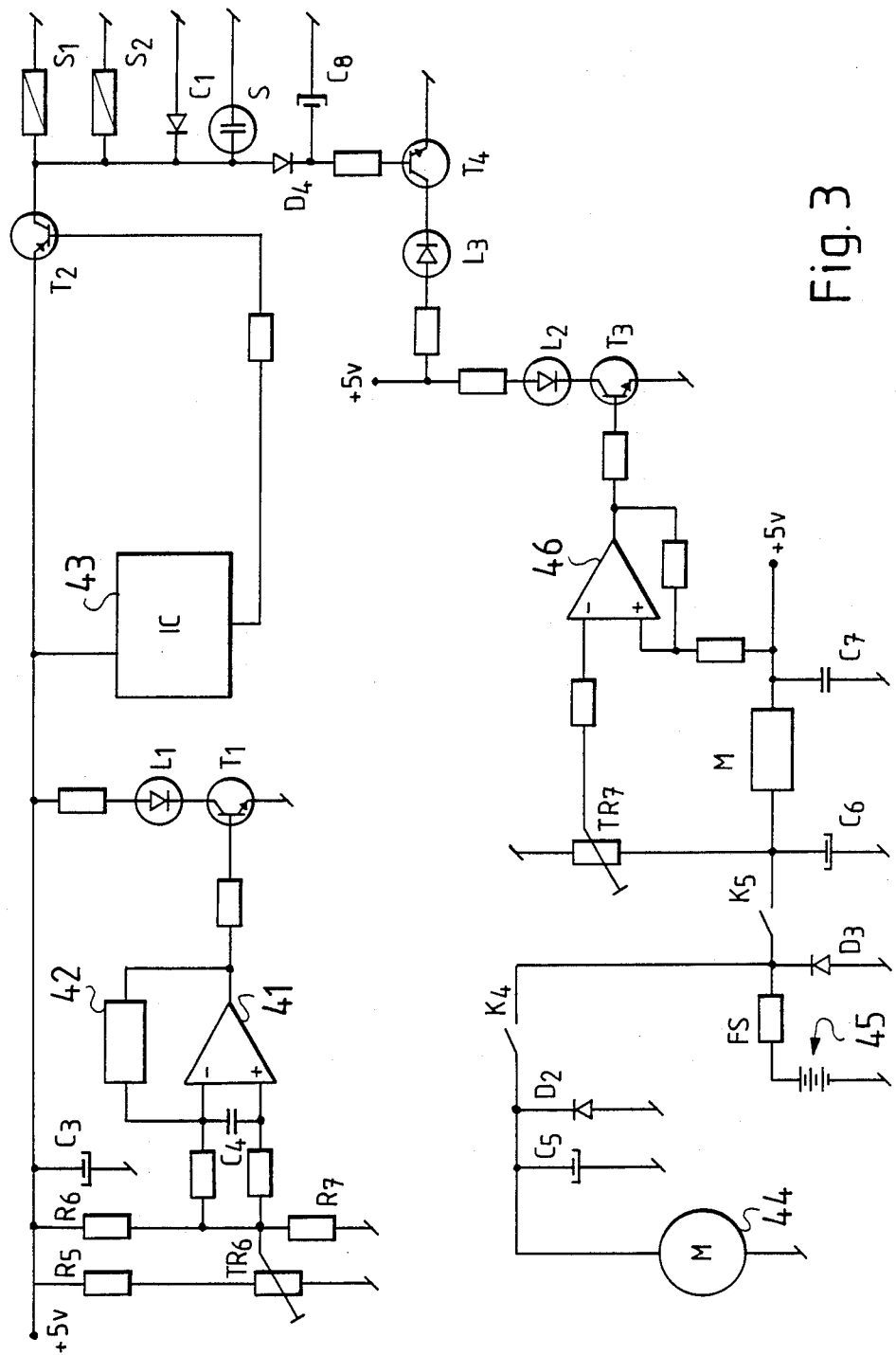

FIG. 3 presents the humidity alarm of the meter of the invention, the timer, the alarm monitoring the fan's supply voltage and the control of the measuring amplifier's gain.

As taught by the invention, the radon content in the air is measured by measuring the ion content of the air caused by the radon in the air and by its decay products. In FIG. 1 is depicted the portable meter of the invention for measuring radon content. The means comprises an outer tube 1 through which air passes, an inner tube 2 consisting of a positive electrode 3, two negative electrodes 4 and 5, and four insulating rings 6-9 separating the electrodes 3-5 and made for instance of Teflon. The means is furthermore provided with a battery 10, a fan 11 for drawing air through the outer tube 1, and an amplifier 12 for amplifying the measuring signal obtained from the negative electrode 4. The means is also provided with a meter 13 for reading the results of measurement.

As taught by the invention, air is drawn with the fan 11 into the outer tube 1, whereby the air passes between the tubes 1 and 2 as shown by arrows in FIG. 1. The walls 14, which are provided with a hatch for replacing the battery 10, and walls 15, prevent air movements inside the inner tube 2. The battery 10 produces an electric field, causing the negative ions in the air to go to the positive electrode 3 and the positive ions, to the negative electrodes 4 and 5. The radon content in the air is found by amplifying the signal produced by the ions accumulating on the negative electrodes 4 and 5, in the amplifier 12, and displaying the result on the meter 13, of which the scale is calibrated to indicate the radon content in the air by measuring the ion content and considering the fact that there is a relationship between the ion content and the radon content in the air.

The wall 14 carries a connector by which the lead 17 of the amplifier can be connected to the lead 18 connecting the negative electrodes 4 and 5. Moreover, inside the inner tube 2 is provided a holder 19 for the battery 10, which holds the battery 10 in place. The terminals of the battery 10 are provided with metal strips 20 and 21, with the first of them, 20, the positive pole of the battery being connected to the positive electrode 3 and with the second, 21, the negative pole being connected to the negative electrode 5. with a view to battery replacement, the second strip 21 may be detached from the battery 10 by turning the negative electrode 5 clockwise or anti-clockwise.

The inner tube 2 can be detached by screwing the tube 2 in the nut 23 fixed to the fixing iron 22 of the outer tube 1, with the aid of a threaded shaft 24. The inner tube 2 is held with the aid of a sleeve 25 which can be screwed on the shaft 24. The shaft 24 passes through the walls 14 and 15 of the inner tube 2. Inside the inner tube 2, upon the shaft 24, is provided an insulating tube 26, which reduces the disturbances incurred during measurement. To reduce disturbances, there is furthermore provided an insulating plate 31, which has been coated at certain points with copper foil 32 and 33. The inner tube 2 may be centred with reference to the outer tube 1 with the aid of guide spindles 27–30. With a view to reducing external interference, the outer tube 1 is grounded.

In FIG. 2 is presented more in detail the measuring amplifier 12 presented in FIG. 1. In FIG. 2 are presented two negative electrodes 4 and 5, a lead 18 connecting said electrodes, a positive electrode 3, and a battery 10, e.g. 22.5 V, supplying the electrodes 3–5. The signal obtained from the negative electrode 4 is with the aid of a connector 16 and a lead 17 carried to an integrating amplifier, consisting of an operational amplifier 34, a resistor R1, a capacitor C1 and a switch K1 controlled by a timer. With the switch K1, the integrating amplifier can be reset to the initial value for integration. The operation of the timer is described farther below. The basic coarse adjustment of the gain of the measuring amplifier is accomplished with a trimmer TR1, to which the signal is directed after being integrated. Furthermore, the signal is filtered with the aid of a capacitor C2.

From the trimmer TR1, the signal is directed to the positive input of the operational amplifier 35. In the operational amplifier 35, the signal is further amplified by feedback. From the operational amplifier 35, the signal is carried to the operational amplifier 36, in which the signal is amplified and in which the signal is corrected, for instance, with regard to the error component caused by thermal creep. Between the output of the operational amplifier 36 and its negative input, a switch K2 is connected, controlled with the timer, in likeness with the switch K1 of the integrative amplifier, and in series with the switch K2 lie the capacitor Ck and the operational amplifier 37, connected in parallel. Both switches, K1 and K2, are controlled to be simultaneously open, whereby e.g. the potential error component caused by thermal creep may be stored in the capacitor Ck, wherefrom it can be applied at the negative input of the operational amplifier 36, this being accomplished with the aid of the operational amplifier 37. In this way, errors can be compensated by comparing the error ocmponent stored in the capacitor Ck and the signal to be amplified in the operational amplifier 36. The compensation can be regulated with the trimmer TR2 connected to the operational amplifier 37.

From the operational amplifier 36, the signal is carried to the feed-back-connected operational amplifier 38, in which the signal is compared with an adjustable reference value. Adjustment is accomplished with the trimmer TR4. Thereafter, the signal is carried to an operational amplifier 39, in which selection of gain takes place with the aid of resistors R2–R4, connected to the negative input and output. The selection of gain is accomplished with a switch K3 and it depends on the ratio of ion contact and radon content present in the air. From the operational amplifier 39 the signal is directed to the meter 40, the input thereof being adjusted with a trimmer TR5.

In FIG. 3 are presented the humidity alarm of the instrument, its timer, the alarm of the fan supply voltage and the control of the measuring amplifier. The humidity alarm circuit is based on a humidity sensor 42 serving as feedback of the operational amplifier 41, its resistance changing with changing humidity. The reference values for the operational amplifier 41 are formed of the $+V$ voltage with the aid of resistors R5–R7 and of the trimmer TR6, with which the alarm limit can be set, by means of voltage divider circuits. The humidity alarm has been implemented with a LED diode L1, switched on by controlling the transistor T1 to be conductive, with a signal carried to the base of the transistor T1 from the operational amplifier 41, for instance when the relative humidity exceeds 70%. Interference filtering capacitors C3 and C4 have furthermore been incorporated in the circuit.

With the timer 43, the operation of the switches K1 and K2, shown in FIG. 2, is controlled. The timer controls with a signal carried to the base of the transistor T2 the driver S1 of switch K1 and the driver S2 of switch K2 in such manner that the $+V$ voltage either has or has not access to the drivers S1 and S2 through the transistor T2. The diode D1 prevents incorrect control of the drivers S1 and S2. A piezo buzzer S may, if required, give acoustic warning indicating that the error compensation presented in FIG. 2 is in action. The operation and selection of the timer are obvious to a person skilled in the art.

The motor 44 of the fan 11 is supplied by a storage battery 45. The motor 44 is protected against voltage peaks by means of the parallel circuit of capacitor C5 and diode D2 connected in parallel to it. A fuse F is used for overload protection of the storage battery 45. Discharge of the storage battery is prevented with the aid of a diode D3. The motor 44 is switched on with a switch K4. The storage battery voltage is monitored with a feedback-connected operational amplifier 46, to the negative input of which the voltage of the storage battery 45 is carried when the switch K5 is closed. The storage battery voltage standardizing may be controlled with the aid of a trimmer TR7. The storage battery voltage can be stored in a memory circuit M, the design of which is obvious to a person skilled in the art. The monitoring circuit furthermore contains filter capacitors C6 and C7. The reference voltage is carried to the operational amplifier 46 from the positive voltage $+V$. When the storage battery voltage falls below the limit that has been set, the transistor T3 is controlled by the operational amplifier 46 to be conductive, whereby the LED diode L2 lights up and an alarm is obtained when the storage battery voltage falls too far.

During the measurement, the LED diode L3 supplied from the +V voltage is lighted. The LED diode L3 is switched on by causing over the diode D4 a control signal from thhe transistor T2, controlled by the timer 43, to appear at the base of the transistor T4 in series with the LED diode L3 and in parallel with which has been provided a filter capacitor C8.

It is obvious to a person skilled in the art that various embodiments of the invention are not exclusively confined to the example described in the foregoing and that they may vary within the claims stated below.

We claim:

1. Portable apparatus for continuously measuring radon content in the air comprising an outer tube through which the radon air passes, an inner tube secured from the outer tube at a distance and containing at least one electrode, at least one extra electrode, and insulator rings separating the electrodes from each other and from ends of the inner tube, a voltage supply connected between the two electrodes, a fan for conducting the air through the outer tube said extra electrode continuously directing ions in the radon gas flow in the outer tube to said at least one electrode without directly converting alpha particles to charged particles, and an amplifier for amplifying the measuring signal obtained from the ions at said at least one electrode, and display means for continuously displaying the amplified measuring signal as a radon content of the radon in the air.

2. Apparatus according to claim 1, wherein the inner tube is detachable from the outer tube.

3. Apparatus according to claim 1, wherein guide means are provided to center the inner tube in the outer tube.

4. Apparatus according to claim 1, wherein the voltage supply is a battery placeable inside the inner tube.

5. Apparatus according to claim 1, wherein the amplifier is provided with a timer with which the measurement may be started or finished.

6. Apparatus according to claim 1, wherein the amplifier is provided with a humidity alarm with which the measurement may be interrupted when humidity in the outer tube exceeds a pre-set limit.

7. Apparatus according to claim 1, wherein the inner tube is provided with two electrodes having the same polarity and interconnected with a conductor.

* * * * *

UNITED STATES PATENT AND TRADEMARK OFFICE
CERTIFICATE OF CORRECTION

PATENT NO. : 4,868,386

DATED : September 19, 1989

INVENTOR(S) : VEIKKO ILMASTI & THOR G. GRAEFFE

It is certified that error appears in the above-identified patent and that said Letters Patent is hereby corrected as shown below:

On the title page:

VEIKKO ILMASTI, Helsinki, Finland;
THOR G. GRAEFFE, Tampere, Finland.

Signed and Sealed this

Fourteenth Day of August, 1990

Attest:

HARRY F. MANBECK, JR.

*Attesting Officer*      *Commissioner of Patents and Trademarks*